United States Patent
Lerzer et al.

(10) Patent No.: US 11,364,926 B2
(45) Date of Patent: Jun. 21, 2022

(54) METHOD FOR OPERATING A MOTOR VEHICLE SYSTEM OF A MOTOR VEHICLE DEPENDING ON THE DRIVING SITUATION, PERSONALIZATION DEVICE, AND MOTOR VEHICLE

(71) Applicant: AUDI AG, Ingolstadt (DE)

(72) Inventors: Jürgen Lerzer, Neumarkt (DE); Nikoletta Sofra, Ingolstadt (DE); Hans Georg Gruber, Ingolstadt (DE); André Ebner, Ingolstadt (DE); Ron Melz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 106 days.

(21) Appl. No.: 16/979,760

(22) PCT Filed: Apr. 4, 2019

(86) PCT No.: PCT/EP2019/058463
§ 371 (c)(1),
(2) Date: Sep. 10, 2020

(87) PCT Pub. No.: WO2019/211055
PCT Pub. Date: Nov. 7, 2019

(65) Prior Publication Data
US 2021/0253119 A1    Aug. 19, 2021

(30) Foreign Application Priority Data

May 2, 2018 (DE) .......................... 102018206717.1

(51) Int. Cl.
*B60W 50/08* (2020.01)
*B60W 40/08* (2012.01)
*B60W 50/00* (2006.01)

(52) U.S. Cl.
CPC .......... *B60W 50/085* (2013.01); *B60W 40/08* (2013.01); *B60W 50/0098* (2013.01);
(Continued)

(58) Field of Classification Search
None
See application file for complete search history.

(56) References Cited

U.S. PATENT DOCUMENTS

| 8,768,567 B2 | 7/2014 | Diab |
| 9,420,401 B2 | 8/2016 | Rao et al. |

(Continued)

FOREIGN PATENT DOCUMENTS

| CN | 103795776 A | 5/2014 |
| CN | 105100189 A | 11/2015 |

(Continued)

OTHER PUBLICATIONS

International Search Report and Written Opinion of the International Searching Authority directed to related International Patent Application No. PCT/EP2019/058463, dated Jul. 5, 2019, with attached English-language translation; 20 pages.

(Continued)

*Primary Examiner* — Jonathan M Dager
(74) *Attorney, Agent, or Firm* — Sterne, Kessler, Goldstein & Fox P.L.L.C.

(57) ABSTRACT

The invention relates to a method for operating a motor vehicle system of a motor vehicle regardless of the driving situation. The method is performed by a personalization device of the motor vehicle and includes identifying the driver of the motor vehicle and using the identity of the driver to determine multiple driver-specific configuration data sets. Each of the determined configuration data sets describes configuration data of a respective user profile of the identified driver in order to personalize the motor vehicle (Continued)

system. The method further includes determining at least one additional occupant in the motor vehicle and using the result of the determination of the at least one occupant, determine an intention of the determined driver. The method further incudes using the determined intention to select a personalization mode from a plurality of personalization modes.

11 Claims, 2 Drawing Sheets

(52) U.S. Cl.
CPC . *B60W 2040/0881* (2013.01); *B60W 2420/42* (2013.01); *B60W 2540/043* (2020.02); *B60W 2540/049* (2020.02)

(56) References Cited

U.S. PATENT DOCUMENTS

| | | | | |
|---|---|---|---|---|
| 9,545,931 | B1* | 1/2017 | Canale | G06V 20/59 |
| 9,707,913 | B1* | 7/2017 | Ochiai | B60W 40/08 |
| 10,060,756 | B2 | 8/2018 | Hansen et al. | |
| 10,173,667 | B2* | 1/2019 | Chan | A61B 5/4875 |
| 10,580,084 | B1* | 3/2020 | Davis | H04R 29/002 |
| 10,696,249 | B2* | 6/2020 | Heinrich | A61B 5/0205 |
| 10,832,261 | B1* | 11/2020 | Chan | G06Q 40/025 |
| 10,850,693 | B1* | 12/2020 | Pertsel | G05D 1/0088 |
| 2007/0038345 | A1 | 2/2007 | Heider et al. | |
| 2009/0055178 | A1* | 2/2009 | Coon | B60R 16/0373 |
| | | | | 704/E15.001 |
| 2010/0036560 | A1* | 2/2010 | Wright | B60R 16/037 |
| | | | | 701/36 |
| 2011/0137520 | A1* | 6/2011 | Rector | H04M 3/42136 |
| | | | | 455/418 |
| 2012/0053793 | A1* | 3/2012 | Sala | B60N 2/0244 |
| | | | | 701/45 |
| 2013/0030645 | A1 | 1/2013 | Divine et al. | |
| 2014/0200737 | A1* | 7/2014 | Lortz | H04L 63/102 |
| | | | | 701/1 |
| 2015/0046060 | A1 | 2/2015 | Nikovski et al. | |
| 2015/0120135 | A1* | 4/2015 | Lawrenson | B60R 25/2081 |
| | | | | 701/36 |
| 2015/0191178 | A1* | 7/2015 | Roy | H04W 4/027 |
| | | | | 701/36 |
| 2015/0370253 | A1* | 12/2015 | Gurin | B60W 50/085 |
| | | | | 701/1 |
| 2016/0264131 | A1* | 9/2016 | Chan | A61B 5/18 |
| 2016/0280161 | A1* | 9/2016 | Lippman | B60R 16/037 |
| 2017/0048239 | A1* | 2/2017 | Jeon | H04W 12/065 |
| 2017/0124406 | A1* | 5/2017 | Singh | G06V 20/597 |
| 2017/0232914 | A1* | 8/2017 | Brenner | B60R 16/037 |
| | | | | 701/36 |
| 2018/0095614 | A1 | 4/2018 | Klos et al. | |
| 2018/0251122 | A1* | 9/2018 | Golston | B60W 50/0098 |
| 2019/0016344 | A1* | 1/2019 | Ehmann | A61B 5/18 |
| 2019/0213429 | A1* | 7/2019 | Sicconi | G06F 3/0346 |
| 2019/0291719 | A1* | 9/2019 | Tiziani | B60W 30/025 |
| 2020/0103905 | A1* | 4/2020 | Gurin | G06Q 10/083 |
| 2020/0114931 | A1* | 4/2020 | Rao | G06V 40/70 |
| 2020/0180534 | A1* | 6/2020 | Köhler | G06V 40/12 |
| 2021/0179117 | A1* | 6/2021 | Glazman | H04S 7/303 |
| 2021/0200506 | A1* | 7/2021 | Winton | H04R 1/22 |
| 2021/0229677 | A1* | 7/2021 | Sugiyama | B60W 40/09 |
| 2021/0261073 | A1* | 8/2021 | Lee | H04W 4/50 |
| 2022/0019646 | A1* | 1/2022 | Bielby | B60R 25/257 |

FOREIGN PATENT DOCUMENTS

| | | |
|---|---|---|
| CN | 106897788 A | 6/2017 |
| CN | 107600072 A | 1/2018 |
| DE | 102013201959 A1 | 8/2014 |
| DE | 112014003714 T5 | 4/2016 |
| DE | 102015225838 A1 | 6/2017 |
| DE | 102016118888 A1 | 4/2018 |
| EP | 3217333 A1 | 9/2017 |
| WO | WO 2005/068259 A1 | 7/2005 |
| WO | WO 2007/075685 A2 | 7/2007 |

OTHER PUBLICATIONS

International Preliminary Report on Patentability directed to related International Patent Application No. PCT/EP2019/058463, completed Jul. 2, 2020, with attached English-language translation; 12 pages.

* cited by examiner

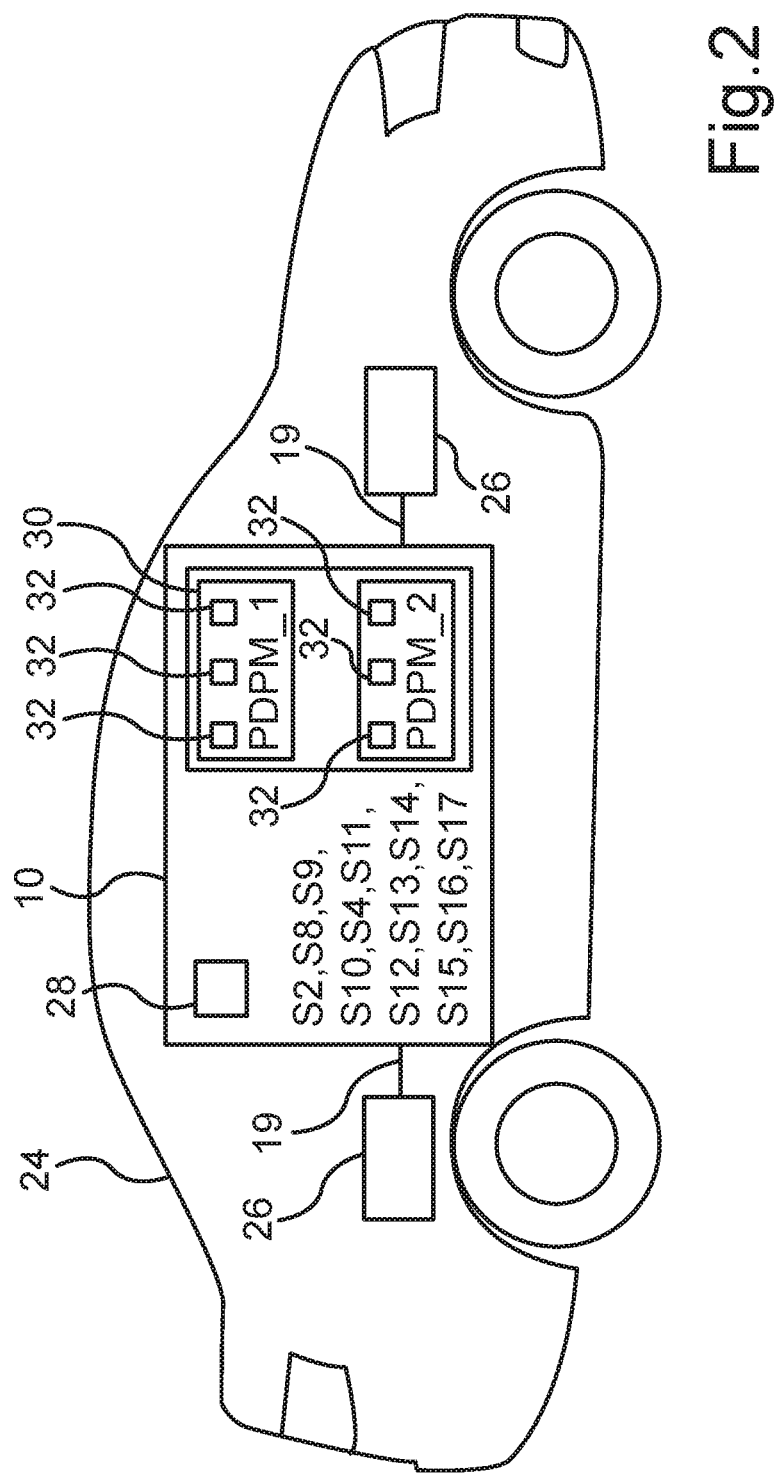

METHOD FOR OPERATING A MOTOR VEHICLE SYSTEM OF A MOTOR VEHICLE DEPENDING ON THE DRIVING SITUATION, PERSONALIZATION DEVICE, AND MOTOR VEHICLE

TECHNICAL FIELD

The invention relates to a method for operating a motor vehicle system of a motor vehicle depending on the driving situation which is carried out by a personalization device of the motor vehicle. The invention also relates to the personalization device, which can be configured, for example, as a control unit of the motor vehicle or as a system of a plurality of devices or a plurality of device components. The invention also relates to a motor vehicle having a personalization device according to the invention, wherein the motor vehicle can preferably be designed as a motor vehicle.

In current and future motor vehicles, these can support a continuously increasing level of personalization. Personalization takes place by identifying or authenticating the driver of the motor vehicle and selecting a user profile depending on an identity of the driver.

The user profile can be stored, for example, in an internal memory of the motor vehicle and/or in a computer cloud or data cloud ("data cloud"); i.e., in a computer network. If it is stored in the data cloud, it must be downloaded to the motor vehicle. If it is stored in the motor vehicle and in the data cloud, corresponding synchronization mechanisms can be used.

A driver's identity can be detected and determined, for example, by various means or a combination of these means. Exemplary means are a key that is assigned to a user, logging in with a password and/or a personal identification number ("pin"), or by biometric identification or authentication of the user, for example by capturing a fingerprint, a face recognition, or an iris detection.

This data can, for example, describe user rights of one or more users and their personal settings. The personalized parameters or data can include, for example: User-specific motor vehicle settings; user-specific lists, for example a list of the last navigation destinations, lists of the last calls or favorites lists, for example a favorites list of radio stations; user-specific screens or background images of a screen, for example a setting of a start screen or welcome screen; user-specific selected content; learned behavior of the user; one or more user-specific motor vehicle function profiles which can describe, for example, which motor vehicle functions were activated, purchased or, for example, downloaded by the user; and a level of skill in motor vehicle functions.

BACKGROUND

WO 2005/068259 A1 describes a method for transferring personal settings from a first motor vehicle to a second motor vehicle, in particular for a driver who changes the vehicle.

DE 10 2015 225 838 A1 describes a method for personalizing at least one setting of a device in the vehicle.

DE 10 2013 201 959 A1 describes an automatic adjustment of a configuration of a motor vehicle to the preferences of the vehicle occupants. A plurality of simultaneous users can be taken into consideration. A common preference of a plurality of users can be determined, for example, on the basis of configuration profiles of the large number of users and/or on the basis of a group configuration profile for the large number of users. In other words, a user profile is provided for a plurality of different users.

However, the prior art mentioned above does not take into consideration which person takes over the driver's function. If the driver wants to have preferences tailored to himself, he has to change settings manually. However, this is not desirable since the driver should be as little as possible concerned with operating an infotainment system, for example, so that he can devote as much attention as possible to the traffic situation.

BRIEF DESCRIPTION OF THE DRAWINGS/FIGURES

FIG. 2 illustrates a schematic representation of a method, according to some embodiments of this disclosure.

DETAILED DESCRIPTION

Figure 1:
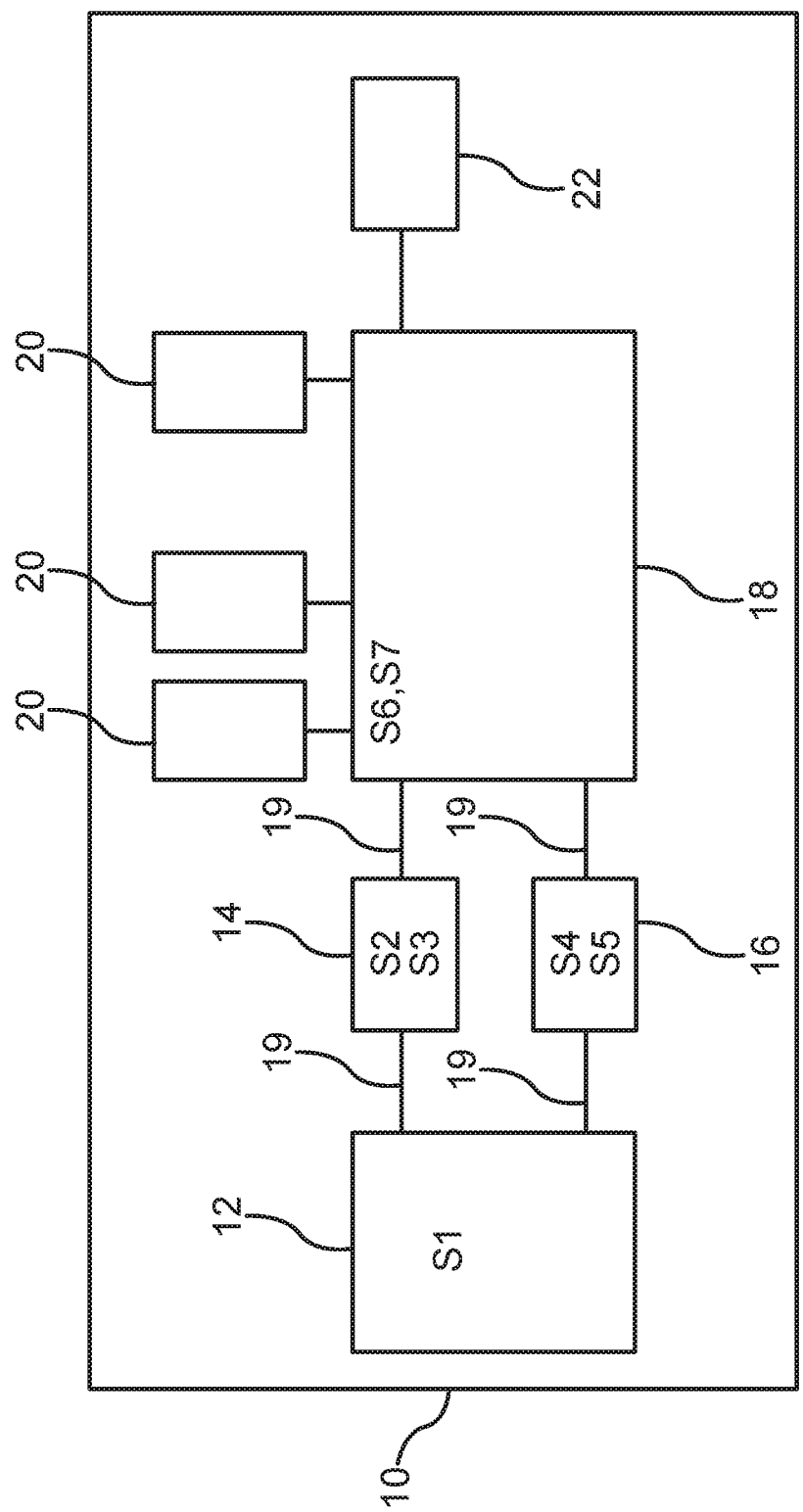
FIG. 1 illustrates a schematic representation of a personalization, according to some embodiments of this disclosure.

One object of the invention is to increase driving safety while driving.

The stated object is achieved by the method according to the invention and the device according to the invention in accordance with the coordinate independent claims. Advantageous further developments are provided by the dependent claims.

The invention is based on the finding that a driver's preference with regard to user settings can depend on the intention of the driver for a trip. The invention is based on the idea of providing a personalization concept that takes into consideration that the behavior of the driver can be different, and wherein the configuration data provided by the user profile take into consideration whether there are additional occupants in the motor vehicle or not and, if so, who the other passengers are. In other words, the invention is based on the concept of providing one of a plurality of the driver's user profiles—i.e., one of a plurality of the driver's user sub-profiles—as a function of an occupancy of the motor vehicle with additional occupants.

The method according to the invention for operating at least one motor vehicle system of a motor vehicle depending on the driving situation comprises the following steps carried out by a personalization device of the motor vehicle. A personalization device is understood to be a device, or a device component, or a system of a plurality of devices, or a plurality of device components, which is designed for identifying a person, as well as to manage a plurality of configuration data sets, and to generate control signals. The personalization device can preferably be designed as a control unit, a combination of control units, or as a control chip.

In a first step, identifying a driver of the motor vehicle is carried out, for example using a received sensor signal from a sensor device—e.g., from a device or a device component for detecting a person—wherein the sensor signal can for example describe a fingerprint or another authentication feature, such as a password or a PIN.

Using an identity of the driver, the determination of multiple driver-specific configuration data sets takes place, wherein each of the determined configuration data sets describes configuration data of a respective user profile of the identified driver in order to personalize the at least one motor vehicle system. In other words, each of the determined configuration data sets describes configuration data for a driver-specific user profile of the identified driver, wherein the configuration data sets can describe a sub-profile.

For example, the identifying of the driver can take place by determining an identity of the driver or a profile of the driver. The determination of the plurality of driver-specific configuration data sets can then take place using the determined identity of the determined profile.

This is followed by determining at least one additional occupant, for example using an additional received sensor signal, which can, for example, describe an authentication feature of the additional occupant, wherein the occupant is a person who is located in the motor vehicle. In this method step, it can preferably be determined whether at least one additional occupant is located in the motor vehicle, and/or how many additional occupants are located in the motor vehicle, and/or who is located in the motor vehicle in addition to the driver, and/or which seat the at least one additional occupant occupies.

Using a result of the determination of the at least one additional occupant, the determination of the determined driver's intention takes place with which he is currently using the motor vehicle. If the personalization device determines, for example, that in addition to the driver, his wife and children are also located in the motor vehicle, it can be determined, for example, based on experience that his current trip can be a personal trip, for example.

Using the determined intention, a personalization mode is selected from a plurality of personalization modes, wherein the selected personalization mode specifies a sub-quantity of the defined configuration data sets, and the at least one motor vehicle system is configured using a configuration data set specified by the selected personalization mode. For this purpose, for example, the selected personalization mode can be activated; i.e., the personalization device can be operated in the selected personalization mode.

In other words, an occupant-dependent configuration of the motor vehicle system takes place. The motor vehicle system can, for example, set a favorites list of radio stations or, for example, a list of those navigation destinations that the user last visited with his family. The sub-quantity of the determined configuration data sets can be specified, for example, by a personalization mode for a trip of the driver with his wife and two children, or for a trip in which the driver is not traveling alone but rather with at least two additional people. It is taken into consideration that the driver behaves differently in the presence of additional passengers, for example in the presence of his family or business partner, and has different motivations for the trip.

In other words, the method according to the invention provides a concept and a technical solution for the implementation of driver-specific user profiles, which depends on the occupants in the motor vehicle. It is taken into consideration in this case that the behavior of the driver differs depending on the situation, whether or not there are additional occupants in the motor vehicle and, if so, who the passengers are.

The invention is based on the finding that an individual user profile makes sense for these different situations. The method according to the invention allows both the driver and an additional occupant to carry, for example, purchased functional, application, and hardware resources into a motor vehicle. The method according to the invention allows such exemplary functional, application, and hardware resources to be carried by one of the occupants and the driver to test these functional, application, and hardware resources as long as the additional occupant is located in the motor vehicle.

Because the driver spends less time manually optimizing the settings, he can devote even more attention to what is going on, which increases driving safety.

Each of the configuration data sets can include configuration data relating to, for example, a predetermined favorites list and/or at least one predetermined navigation destination and/or predetermined contact data and/or a predetermined image file as a background image of a screen and/or predetermined settings for an activation state of the motor vehicle. The respective parameters can be predetermined, for example, by assigning the respective parameter—e.g., the exemplary favorites list or the exemplary list of navigation destinations—as a function of the at least one additional occupant determined and/or as a function of the predicted intention.

These parameters are parameters whose personalization is particularly important since they are either very relevant for operating the motor vehicle or are particularly preferred parameters, for example the background image of the screen, which is often desired by the driver while driving.

According to a preferred embodiment of the method according to the invention, the personalization device can be operated in an operating mode. In the operating mode, the personalization device can receive an operating signal that describes an operating action for specifying the selected personalization mode as the operating mode to be activated, wherein the driver's intention can also be determined as a function of the selected personalization mode.

The driver of the motor vehicle can be offered the option, for example, to select the configuration data set or a trend of the user settings with which the motor vehicle is to be configured, depending on a current mood or condition. This embodiment therefore gives the driver the opportunity to influence the settings. For example, if the driver is traveling with business partners and would like to go on a private excursion with them, he can adjust the user settings to his motivation.

The determination of the driver's intention can preferably take place by predicting or forecasting the driver's intention as a function of the determination of the at least one additional occupant. This makes the selection of user settings much more individual.

For the determination of the at least one additional occupant, the personalization device can preferably determine an identity of the at least one additional occupant, for example using a sensor signal from an exemplary camera, wherein the sensor signal is able to describe, for example, a face scan of the additional occupant. The driver's intention can then be determined using the determined identity of the at least one additional occupant. In this way, the individual passenger occupation in the motor vehicle can be determined. In other words, user profiles can be provided that are tailored to a composition of specific people.

Alternatively or additionally, for determining the at least one additional occupant, the personalization device can determine a classification of the at least one additional occupant. Determining the classification can include, for example, the determination of a property of the at least one additional occupant, for example the determination of an age and/or a gender of the at least one additional occupant. Using this property, the at least one additional occupant can then be divided into a specified occupant category, for example into the "adult," "child," "family," or "colleague" category. In other words, an association of, for example, an identity of the at least one additional occupant can take place in a specified category, or in a predetermined classification, or in a predetermined group of people.

According to this embodiment of the method according to the invention, the driver's intention can be predicted using or depending on the determined classification of the at least one additional occupant. Suitable user settings can thereby be determined even more precisely.

According to a further development, the determination of the classification of the at least one additional occupant can take place as a function of: a determined age or a determined age group of the determined at least one additional occupant; and/or a determined current occupant combination; and/or a determined identity of the respective at least one additional occupant; and/or a determined seat of the determined, at least one additional occupant. For this purpose, for example, a determining of the current occupant combination and/or a seat of the at least one additional occupant and/or a seat combination of a plurality of additional occupants can take place. Such classifications make possible a configuration of the motor vehicle system that is specific to the driving situation.

In a further embodiment of the method according to the invention, the personalization device can respond to a longer-term change in the user's preference, for example via machine learning. This can be the case, for example, if the driver develops new or different behaviors over several years, for example. According to this embodiment, the personalization device can determine at least one reconfiguration process controlled by an operating action of the user of the motor vehicle for changing or adjusting the configuration data set of the selected personalization mode. In other words, a manual reconfiguration of the motor vehicle system can be determined. The operating action can be an operating action by the driver and/or the at least one additional occupant.

Depending on the reconfiguration process determined, the changed configuration data set can be stored, for example in a data storage of the motor vehicle and/or the personalization device. The stored configuration data set is then assigned to the determined intention.

For this purpose, the personalization device can operate, for example, a "deep learning engine," wherein the deep learning engine is able to predict this as an empirical value using information about the operating action, for example in order to give preference to the driver in a specific driving situation with a specific occupant configuration. An empirical value is understood to mean a value or an indication which assigns a function or setting change triggered by the operating action to the occupant configuration and can, for example, carry out a statistical analysis which provides information about the probability of a high relevance of this function as a basic setting. In other words, an empirical value can be a numerical value or an assignment value, for example. An empirical value can also be understood to mean a functional dependency or a functional assignment that makes a statement as to whether a manual change of setting by the driver has a high preference.

A deep learning engine is understood to mean a device or a program that can apply so-called deep learning (in-depth learning, machine learning) to a plurality of data. In other words, the deep learning engine is a sophisticated application for carrying out in-depth learning; i.e., an implementation of artificial intelligence. In other words, artificial intelligence as well as machine learning and in-depth learning can be implemented using the deep learning engine. The deep learning engine can, for example, be designed as a deep, artificial neural network—i.e., in other words—can be designed to use a machine learning method to generate a plurality of empirical values, according to a predetermined algorithm and evaluate using the already stored large number of empirical values, according to the logic contained therein, for example a correlation. This also allows further logical links to be created in the deep learning engine.

The object is achieved by an embodiment of the personalization device according to the invention, which is designed to carry out the method steps relating to a personalization device of a method of the above-described embodiments of the method according to the invention. The personalization device can be configured, for example, as a device network, device or as a system of a plurality of control chips. The aforementioned advantages result here.

The personalization device can preferably have a processor device; i.e., a device component or a component for electronic data processing. The processor device can preferably comprise at least one microcontroller and/or at least one microprocessor. A program code can be stored in an optional storage device—i.e., in an optional data storage—for example of the motor vehicle or the personalization device, which can be designed to cause the personalization device, when executed by the processor device, to carry out the method steps of the method according to the invention relating to the personalization device.

In a special and suitable embodiment of the personalization device, it can have a sensor device—i.e., a device or a device component for detecting a property of an object—wherein the sensor device can have, for example, a fingerprint sensor or a face scanner. In addition, the personalization device can have a driver identification device, an occupant recognition device (which can also be referred to as "occupant detection, occupant classification, and occupant identification device"), and a user profile management device. The driver identification device can be designed, for example, as a control chip having suitable software for identifying the driver using the exemplary sensor signal. The occupant recognition device can, for example, be designed to carry out the detection, classification, and/or identification of the at least one additional occupant. The driver identification device and the occupant recognition device can be structurally combined as an example. The user profile management device can also be configured, for example, as a chip having a microprocessor and/or a microcontroller and can be designed for electronic data processing.

The object set is achieved, while achieving the advantages mentioned further, by a motor vehicle which has an embodiment of the personalization device according to the invention. The motor vehicle can preferably be designed as a motor vehicle, for example as a passenger car.

The invention also includes the combinations of the described embodiments.

The invention also includes refinements of the method according to the invention, which include features such as those that were previously described in connection with the refinements of the motor vehicle according to the invention. For this reason, the corresponding refinements of the method according to the invention are not described again herein.

Embodiments of the invention are described below. In the drawings:

FIG. 1 is a schematic representation of an embodiment of the personalization device according to the invention; and FIG. 2 is a schematic representation of one embodiment of the method according to the invention.

The embodiments explained below are preferred embodiments of the invention. In the embodiments, the components of the embodiments that are described each constitute individual features of the invention to be considered independently of one another, which individually also further develop the invention independently of one another and are thus also to be considered part of the invention both individually and in a combination that is different from the combination described. In addition, the embodiments described can also be supplemented by further features of the invention, which have already been described.

In the figures, functionally identical members are each denoted with the same reference signs.

FIG. 1 illustrates the principle of the personalization device according to the invention, which can be designed, for example, as a control unit of a motor vehicle or as a control chip, using a first embodiment.

For this purpose, the personalization device 10 can have, for example, a sensor device 12, for example a device or a device component for detecting a property of a user or an object. For this purpose, the sensor device 12 can have, for example, one sensor or a plurality of sensors, preferably a set of sensors, for detecting and/or recognizing a human being and/or a person. Additionally or alternatively, the sensor device 12 can be designed and configured to detect an identity and/or to classify a person. For this purpose, the sensor device 12 can have, for example, one or more interior cameras, and/or one or more fingerprint sensors, and/or one or more sensors for detecting a motor vehicle key, and/or one or more exterior cameras. The sensor device 12 can, for example, generate a sensor signal that can, for example, describe an image of a face of the driver and/or an additional occupant, or for example a fingerprint of the driver and/or the additional occupant.

The personalization device 10 can additionally or alternatively have a driver identification device 14, which can be configured, for example, as a control board with a microprocessor and/or a microcontroller, wherein the driver identification device 14 can be designed to identify the driver using the exemplary sensor signal. For this purpose, the driver identification device 14 can, for example, compare the fingerprint described by the sensor signal with an image of a stored fingerprint.

The personalization device 10 can optionally be referred to as a "motor vehicle driver personalization system." The personalization device 10 can preferably be designed as a control device or as a function in a control unit or centrally in, for example, a gateway or in an infotainment system. The personalization device 10 can have, for example, a program code for carrying out the method according to the invention.

An optional occupant recognition device 16, which can also be referred to as an "occupant detection, occupant classification, and occupant identification device," can correspond to that of the driver identification device 14 in terms of the function and the setup thereof and can be designed to identify and/or classify an additional occupant of the motor vehicle. For classifying the additional occupant, it can be provided, for example, that the identity of the occupant can first be determined using the exemplary fingerprint and that the occupant can be classified using the derived identity; i.e., he can be classified into a category. If the occupant is identified, for example, as a person with a predetermined name, it can be derived, for example, using a digital assignment table that the occupant is, for example, a man and/or a family member. Optionally, the driver identification device and the occupant recognition device can be structurally coupled to one another or can be implemented, for example, by one and the same component.

A user profile management device 18 can, for example, be designed as an additional control board with a processor device or can be connected to a processor device of the personalization device 10. The user profile management device 18 can also be referred to as a user profile management system.

The devices of the personalization device 10 are connected to one another in the example of FIG. 1 by data communication connections 19. A data communication connection 19 can be configured, for example, as a wire connection, for example as a data bus of the motor vehicle. Alternatively, the data communication link 19 can be, for example, a wireless data communication link, for example a WLAN or Bluetooth LE connection.

The example in FIG. 1 additionally shows optional personalized applications 20, so-called applications or user programs. These can be present, for example, as program code and can be present, for example, in a storage device (not shown in FIG. 1) of the personalization device 10.

FIG. 1 also shows an optional user profile management interface 22, which can preferably be designed as a computer-aided user interface.

The example in FIG. 1 can optionally be viewed as an example of a system architecture for a personalization device 10 configured as a passenger-dependent or occupant-dependent driver use profile system.

The individual components of the example in FIG. 1 are described once again below by way of example.

The sensor device 12 can include one or more sensors which can be designed for detecting and/or authorizing a (human) identity. Additionally or alternatively, the sensor device 12 can be designed to recognize and/or classify a person. The sensor device 12 can have, for example, one or more of the following sensors:

One or more interior cameras of the motor vehicle, for example for the driver and/or the passengers—for example a camera—can be aimed at the driver and/or at one or more occupants (such as, for example, the seats). An optional embodiment of the interior camera can provide, for example, that it can be arranged in or on a rear seat of the motor vehicle. An interior camera can preferably be designed as a 360-degree camera; i.e., take an all-round image in the interior.

One of a plurality of sensors for detecting a "smart" motor vehicle key, for example by detecting an RFID code or a radio signal of the vehicle key. Suitable agents and alternatives are known to the person skilled in the art from the prior art.

One or more biometric identification sensors, for example one or more sensors for detecting a fingerprint and/or an eye iris and/or a face of an occupant.

One or more exterior cameras, which are preferably ready to sense or detect a driver and/or an occupant as soon as the motor vehicle approaches the vehicle. Suitable proximity sensors are known to the person skilled in the art from the prior art.

one or more sensors for detecting a personal mobile terminal device, for example a portable, mobile terminal device, which can be configured as a smartphone or a tablet PC, for example. Such a mobile device can be explicitly or implicitly associated with a profile or an identity of the user. For this purpose, the exemplary mobile terminal can, for example, transmit a radio signal to the sensor device 12, wherein the sensor device 12 can be designed to use such a radio signal to detect an identification code transmitted with it and/or a device number of the mobile, portable terminal device described thereby. Using such an exemplary device number, for example, the identity of the person approaching the motor vehicle can be inferred.

Detecting a portable device, preferably a portable "smart" device, which in the manner described above can preferably be explicitly or implicitly associated with a profile or an identity of the user. Exemplary portable devices are fitness wristbands or waist belts or fitness wristwatches.

One or more sensors for detecting the presence of a person, which can be integrated, for example, in a motor vehicle seat. For example, a capacitive sensor can be used for this purpose.

One or more sensors for detecting a status of one or more motor vehicle doors and/or seat belts. Suitable sensors are known to the person skilled in the art from the prior art.

The sensor device 12 can, for example, generate a sensor signal (method step S1), which can describe the exemplary, detected fingerprint—or, for example, the face scan—as raw data. This output of the sensor or sensors can be made available to the driver identification device 14 and/or the occupant recognition device 16 in that the generated sensor signal can be transmitted to these devices.

According to the example in FIG. 1, the driver identification device 14 can use the data described by the sensor signal as an input variable. The driver identification device 14 can be designed to identify the driver by means of one or a combination of a plurality of the following methods/technologies (S2):

Detecting a motor vehicle key, wherein the detected motor vehicle key is able to be assigned to a user, for example using an identification code of the motor vehicle key and/or information about the user, wherein it is then possible to infer the user;

Biometric identification of the user, for example using a fingerprint, capturing a face, capturing an iris, capturing a personal mobile device, and/or a handheld device that is or can be explicitly or implicitly associated with a profile and/or an identity of the user;

Detecting a portable, "smart" device—for example, a so-called "wearable"—which can be designed as a portable accessory for data processing known to the person skilled in the art from prior art, wherein the portable device can be explicitly or implicitly associated with a profile and/or an identity of a user;

A sensor or sensors for detecting a presence of the user, wherein the sensor or sensors can be designed, for example, as a capacitive proximity sensor, and can preferably be arranged in, for example, a motor vehicle seat; and/or One or more sensors for detecting a status of motor vehicle doors, for example for detecting whether a door has been opened and/or closed; and/or one or more sensors for detecting a status of one or more seat belts, wherein it is possible, for example, to detect whether a seat belt has been closed; here, for example, it can also be deduced in which seat an occupant can be located.

Additionally or alternatively, the driver identification device 14 can provide the detected and recognized driver identity and/or a profile of the driver. For providing the detected driver identity or the detected profile of the driver, the driver identification device 14 can generate a corresponding signal and transmit it to the user profile management device 18 (S3).

The occupant recognition device 16 can, for example, detect whether other (human) passengers or occupants besides the driver are located in the motor vehicle, for example in a front passenger seat and/or in rear motor vehicle seats. This can be done, for example, by means of one or more interior cameras for monitoring the passengers and/or seats in the front passenger seat and/or on the rear seat, or via, for example, a single camera that monitors the interior of the motor vehicle. Such cameras can preferably be part of the sensor device 12, which can provide, for example, a corresponding camera image as an input variable for the occupant recognition device 16. For example, an image-based classifier, for example software for facial recognition and/or software for image analysis, can be used to determine (S4) whether additional occupants are located in the motor vehicle.

Alternatively, it can be determined in method step S4 how many occupants are located in the motor vehicle, and/or who is located in the motor vehicle, and/or on which seat the occupant(s) is/are located. Optionally, the (human) occupant(s) in the motor vehicle can be classified, for example using the image-based classifier already mentioned. An exemplary class that can be assigned to the occupant can be based on an age, for example, an occupant can be assigned to the class "children" or "adults." For organizing or assigning to the classes—e.g., for classifying—for example, an identity of the occupant can first be determined, wherein it is possible for each of the identities to be specified to which class the corresponding identity it is assigned or should be assigned.

Additionally or alternatively, the system—e.g., the occupant recognition device 16—can determine whether the occupant or the occupants were previously traveling together in the motor vehicle in this configuration, for example using a Bluetooth ID. The Bluetooth ID can be, for example, an identity number of a user's personal mobile device, which can be stored on the device. Such "Bluetooth beacons" or "radio beacons" can be mounted on the mobile terminal device and detected and/or measured in the motor vehicle using radio receivers. A corresponding technique is known to the person skilled in the art from methods of the prior art for localizing objects for, for example, triangulation or multilateration with the aid of mobile radio systems.

Optionally, the occupant recognition device 16 can provide information (S5) as to whether any additional occupants different from the driver are located in the motor vehicle. In other words, the occupant recognition device 16 can provide classification information and/or configuration information, and/or, identity, and/or a profile of the at least one additional occupant of the user profile management device 18, preferably including information about a seat of each, at least one, additional occupant as output information.

The user profile management device 18 can use the input variables or input data from the driver identification device 14 and the occupant recognition device 16 to select a suitable profile of the driver, such a profile also being able to be referred to as a sub-profile.

For this purpose, for example, after authentication of the driver and the optional passenger (i.e., the optional occupant), the user profile management device 18 can access stored data, for example, which can each describe a corresponding profile. These data or data records can be stored, for example, in a data storage of the motor vehicle, and/or in one or more personal, mobile devices, and/or, for example, in a server device external to the motor vehicle, wherein the server device external to the motor vehicle can be configured, for example, as a data cloud.

By way of example, these data can originate from previously observed behavior of the user (preferably the driver), or, for example, can have been input by the user himself. Additionally or alternatively, the user can select settings that can be described by the respective data, for example from generic profiles; i.e., for example, from collections of specified preferences.

Optionally, the user profile management device 18 can generate and/or access configuration profiles and/or adapt such configuration profiles. This means that settings relating to a matching presence of specific users in the motor vehicle—i.e., a specific configuration of the occupants—and, for example, additionally depending on their assigned roles as driver or passenger, are generated and/or adapted. A newly created configuration profile can be stored in the exemplary data storage. Such configuration profiles can be accessed, for example, by accessing the data storage. A configuration profile can be updated and/or adjusted, for example, by detecting driver behavior and associating it with manual changes to the settings made manually by the driver, for example. A data record that contains a sub-profile for, for example, the occupant configuration "entire family with children" can then be changed and thus adapted by overwriting the corresponding data for the settings.

Additionally or alternatively, the user profile management device 18 can receive (S6) the following information from the driver identification device 14 and/or the occupant recognition device 16, wherein a motor vehicle having five seats can be assumed as an example below. For example, information about the driver can be provided, for example using an identity or the identity number assigned to the driver. In addition, information about an occupant in a front seat, preferably the front passenger seat, information about an occupant in the left rear seat, information about an occupant in the middle rear seat, and information about an occupant in the right rear seat can be provided. The following information, for example the following information described by a corresponding input signal, can be provided as input variables, in the order of the aforementioned information:

Driver:
Driver_ID
Front-seat passenger:
Pass1_occupied status; (<Pass1_Classes>Pass1_ID)
Passenger in a left rear seat ("Rear-Seat-left Passenger"):
Pass2_OccupiedStatus; (<Pass2_Classes>Pass2_ID)
Passenger in a middle rear seat ("Rear-Seat mid Passenger"): Pass3_OccupiedStatus; (<Pass3_Classes>Pass3_ID)
Passenger in a right rear seat ("Rear-Seat right Passenger"): Pass4_OccupiedStatus; (<Pass4_Classes>Pass4_ID).

The user profile management device 18 can provide (S7) passenger-dependent personalization modes (PDPM), for example the driver of the motor vehicle can manually set which type of these personalization modes he prefers. These personalization modes can be called up from the data storage, for example. Such a personalization mode can optionally be changed by the user profile management device 18.

The following exemplary passenger-dependent personalization modes can be, for example:

A first personalization mode PDPM_1 can, for example, stand for passenger-independent personalization; i.e., the driver does not care which sub-profile is selected.

A second personalization mode PDPM_2 can be a mode for passenger-dependent personalization, wherein criteria or a criterion can be taken into consideration whether at least one additional passenger or occupant is located in the motor vehicle or not. For example, if the driver is driving in his motor vehicle with two children and a woman, the personalization mode PDPM_2 can be, for example, a mode "driver+woman" or "driver and a child"; i.e., describe appropriately tailored settings.

In a third optional personalization mode PDPM_3, for example, a passenger-dependent—i.e., an occupant-dependent personalization—can take place, which can specify a criterion or criteria as to whether the personalization fits all occupants or passengers in the motor vehicle. This personalization mode can, for example, specify that, for example in the case of a configuration with a total of three occupants including the driver in the motor vehicle, those sub-profiles are then to be made available whose settings fit each of the three occupants. Such information as to whether the respective settings match the occupants can be specified, for example, in a corresponding file for the settings of the sub-profile.

In a personalization PDPM_4, for example, a passenger-dependent personalization can provide a criterion such that the personalization fits at least one of all occupants in the motor vehicle.

In the case of a configuration-dependent personalization, this can correspond, for example, to the personalization mode PDPM_3 described above in a corresponding personalization mode, whereby the additional restriction can provide that only those sub-profiles can be made available in this mode that also apply to an exact seating position of the existing occupants, or each of the occupants has the specified identity.

In the case of passenger-dependent personalization depending on a classification of the occupants and/or occupied seats—i.e., the seat occupancy—only those sub-profiles can be provided which can take into account an exact seating arrangement.

Additionally or alternatively, the user profile management device 18 can provide a driver ID and/or a status of the seat occupancy of the motor vehicle and, optionally, the identities of the occupants or passengers. Additionally or alternatively, corresponding personalization modes can be provided for personalized user programs.

One or more of the exemplary personalized applications 20—i.e., the exemplary user programs—can be passenger-dependent and can be dynamically adapted to the data and/or parameter set. This can take place, for example, while driving and depending on events and/or processes of the user profile management device 18. In other words, a sub-profile can be selected from a collection of sub-profiles of the driver in a selected personalization mode, which can be selected, for example, by the driver by means of a voice input or another operating action, wherein the selected sub-profile can specify the settings of the applications 20. In this case, for example, user programs ("apps") and/or for example a favorites list can be personalized or adjusted. Exemplary applications or user programs can be, for example, a user-specific list, for example a list of the last navigation destinations, a list of the last callers or calls, or a favorites list, for example a favorites list for radio stations.

Such a personalized application can, for example, mark each list entry with, for example, a driver ID or a classification, for example, assign each entry to a master list of radio stations to different sub-profiles or personalization modes. For example, each of the list entries can be marked with a current driver ID including a status of the seat occupancy in the motor vehicle, optionally in addition to an occupant class and/or identities or IDs of the additional occupants at a point in time at which a corresponding event takes place.

Additionally or optionally, personalized applications can describe filtered list entries that, for example, do not match the selected personalization mode and/or do not match an identity or ID of the current driver and/or a current motor vehicle seat occupancy status and/or a current class or classification of occupants and/or corresponding profiles.

Additionally or alternatively, such an event—for example, a trip—can also have an ID—i.e., an identity—in the current configuration.

If, for example, the driver selects the personalization mode PDPM_1 and, for example, at least one additional passenger is located in the motor vehicle, only the last entries and navigation destinations at which the driver was not alone in the motor vehicle at the time when the navigation destination was input have to be displayed, for example.

If the personalization mode PDPM_2 is selected by way of example and is thus specified or predetermined, and if at least one additional passenger or occupant is located in the motor vehicle, for example, only those last navigation destinations that are usually or preferably approached when all passengers are in the motor vehicle can be displayed.

If, for example, the personalization mode PDPM_3 is selected and thus specified, and there is at least one additional occupant in the motor vehicle, for example the driver and an additional occupant, only those last navigation destinations that were input when the driver and the at least one of the occupants were located in the motor vehicle at the time of entry can be displayed as entries.

Depending on a detected class of the occupant, preferably the at least one additional occupant, for example children in the back seat, media contents of the infotainment system, and/or settings (for example a maximum adjustable volume) can be automatically set or limited to this. Additionally or alternatively, one or more profiles or parameters for canceling or blocking the control of the motor vehicle and/or steering of the motor vehicle can take place. Additionally or alternatively, parameters of a driver assistance system can be changed automatically, for example, so that a comfort mode is set instead of a dynamic mode, for example.

If, for example, an additional occupant is located in the motor vehicle together with a driver, optionally depending on the identity of this occupant, a selection of screens can be made, for example, on which specific content can be provided. For example, warnings relating to vehicle guidance or driving the motor vehicle can only be displayed on a cluster of instruments and/or an input can be accepted, for example a change in the navigation destination. Such settings can, for example, be set or restricted automatically.

The personal application 20 can be, for example, a passenger-dependent application 20 that can select an element from a selection pool that is to be used during a trip. Such an element can be, for example, a welcome screen image or, for example, a background image or a computer animation ("skinning") of the human-machine interface, or a background design of a display. Alternatively, such an element can be a welcome text, for example. Such personalized applications 20 can preferably select the element in order to use or display it in accordance with the selected and thus specified personalization mode and/or, for example, a current identity of the driver. Alternatively or additionally, the use or output, for example displaying, of such an element can take place as a function of a current seat occupancy of the motor vehicle and/or current identities of the occupants. The tagging of an element can be selected by the driver, for example, or can be done automatically. In the case of automatic tagging, for example, an identity of the current driver, a current seat occupancy of the motor vehicle, and/or the identities of additional occupants at the time when the driver creates, selects, and/or updates the element, for example a background image, can be taken into consideration.

As an example, different welcome images can be downloaded for a screen or generated by the driver, for example for different occupations of the motor vehicle. The system—e.g., the personalization device 10—can select a corresponding image depending on the current occupancy of the occupants in the motor vehicle.

Personalized applications 20, which may be dependent on the occupant and which may allow and/or switch off specific applications and/or functions, may be available to the user while driving, for example as a so-called "function-on-demand management function." Such an application and/or function can be, for example, a hardware setting. Exemplary personalized applications 20 can be:

Personalized applications 20, which allow or block availability, an application, and/or function, which can be for example connected in parallel for the driver and/or for the user while driving, preferably depending on the specified personalization mode and for example depending on an identity of the current driver, and/or a current seat occupancy of the motor vehicle, and/or the identities of additional occupants.

Such personalized applications 20 can optionally allow or block the availability of an application and/or function, which may be activated for an additional occupant, for example, or for the user while driving, preferably depending on the specified personalization mode and/or the identity the current driver, the current seat occupancy of the motor vehicle, and the current identities of the additional occupants.

In one example, for example, a "function-on-demand" application can be provided, which can be bought by the driver, for example, whereby this application can be made available to the current occupants depending on the specified personalization mode.

According to a further example, a so-called "function-on-demand" application can be provided which, for example, was not bought by the driver, but rather by one of the additional occupants, for example. The function—for example, a specific program code for carrying out the function—can be stored, for example, on a mobile terminal device of the occupant and can be downloaded from this mobile terminal; or, for example, from a data cloud from the Internet. This application can then be provided to the motor vehicle and the user as soon as the passenger who bought the application can be located in the motor vehicle.

Optionally, personalized applications 20 can be made available to the user while driving, which are occupant-dependent and which, for example, allow or block functions via the services of a hardware component, wherein such a function can be designated, for example, as a "hardware-capability-on-demand management function." Such personalized applications 20 allow and/or block such availability of hardware potential, which can be activated, for example, for the driver, and the other users while driving, preferably depending on the specified personalization mode and, for example, an identity of the current driver, the current seat occupancy in the motor vehicle, and identities of current passengers. Optionally, such personalized applications can allow and/or block the hardware performance or the hardware functionalities, which, for example, can be activated for a passenger, for a user while driving, preferably depending on the specified personalization mode and an identity of the current driver, a current seat occupancy of the motor vehicle, and identities of current, additional occupants.

According to a further example, the hardware performance or hardware functionality can be, for example, an increase or growth in processor performance that was bought by the driver, for example. Such can be made available to the current occupants depending on the specified personalization mode. Alternatively, such an increase in processor performance as a service may have been purchased by an occupant other than the driver, wherein this function can be made available to the motor vehicle and its users as long as this passenger is located in the motor vehicle.

The user profile management interface 22 may, for example, allow or enable the driver to change the personalization mode and/or the setting for a determined personalization mode. For this purpose, the driver can, for example, be provided with an operating device of the user profile management interface 22, for example a keyboard or a device component for speech recognition.

In other words, manual influence can be exerted, preferably before the sub-profile is selected. In other words, the driver can specify which personalization mode is to be used.

FIG. 2 illustrates the principle of the method according to the invention using an embodiment in which a motor vehicle 24 is configured, for example, as a passenger car and can have a plurality of motor vehicle systems 26. The motor vehicle systems 26 can be, for example, an infotainment system and an instrument cluster or, for example, an infotainment system and a controller for a seating position.

The motor vehicle 24 has a personalization device 10, which can be, for example, the personalization device 10 described for FIG. 1. Both the personalization device 10 of FIG. 2 and the personalization device 10 of FIG. 1 can each have a processor device 28, which can have, for example, a plurality of microprocessors and/or a plurality of microcontrollers. In FIG. 1, the optional processor device 28 is not shown for reasons of clarity.

The personalization device 10 of FIG. 2 also shows an optional storage device 30, which can be designed as a common data storage. A program code for carrying out the method according to the invention can be stored on this data storage.

Method step S2—identifying the driver of motor vehicle 24—has already been described in detail for FIG. 1. Using this identification step, an identity of the driver can be determined, on the basis of which a plurality of driver-specific configuration data sets 32 can be determined (S8). By way of example, six configuration data sets 32 can be stored in the storage device 30. Each of the configuration data sets 32 can, for example, describe different settings for the exemplary infotainment system and/or the exemplary controller of the seating position, or variants of combinations. All of these configuration data sets are, for example, driver-specific for the same driver.

In method step S4, for example, three additional occupants can be determined, in addition, for example, the identities of the occupants, for example the driver's wife and the driver's children, and an age group (adults, children) can be determined.

As an example, the three of the configuration data sets 32 in each case can be assigned to a personalization mode (PDPM_1, PDPM_2). In other words, the corresponding configuration data sets 32 for configuring (S9) the motor vehicle system 26 or the motor vehicle systems 26 can be available in the personalization mode PDPM_1.

For example, by analyzing the data collected in this way about all occupants or about the additional occupants, using a deep learning engine, which was previously trained using machine learning to link occupant combinations and intentions of a trip with a motor vehicle, in the method step S10, an intention of the determined driver is predicted (S10) before using the motor vehicle 24. In the example of FIG. 2, this can be a family trip, for example. Using the predicted intention, the personal mode(s) PDPM_1 and/or PDPM_2 can then be selected as driver-specific personalization modes for the intention "family trip" (S11), and can be displayed, for example, on a screen of the exemplary infotainment system or on a screen of the instrument cluster. The exemplary personalization modes PDPM1, PDPM_2 can be, for example, the modes that include settings for a driver's trip with two children and a woman, or for example a driver's trip with two people in the back seat.

As an example, the driver can manually decide which personalization mode (PDPM_1, PDPM_2) should be used.

For example, one of the configuration data sets 32 of a family profile can describe the last navigation destinations in a favorites list that were last approached in the occupant configuration, for example an amusement park or the address of the family weekend house.

It can optionally be provided that the driver can select (S17) the personalization mode PDPM_1, for example, by means of an operating action for providing the last navigation destinations but use the personalization mode PDPM_2 for a screen background. In other words, the driver can specify, for example, a selection of navigation destinations or other user programs, which profile category he would like to have.

In the example in FIG. 2, the configuration data sets 32 are shown as being stored in the personalization device 10 of the motor vehicle, alternatively, however, the configuration data sets 32 can also be mirrored, for example, in a data cloud, so that they are available for the driver for a trip with another motor vehicle 24.

If the determination of an identity (S12) or a classification (S13) of the at least one occupant takes place, the configuration can be carried out even more individually and depending on the situation.

Overall, the embodiments show how the invention allows occupant-dependent personalization of a motor vehicle system 26.

According to a further embodiment, the personalization device 10 can provide a personalization system for a driver of the motor vehicle 24, which:

can detect the present information by means of the driver identification mechanisms or by observing an interior of the motor vehicle 24 (S2, S4): An identity and/or a profile of the driver; and/or information as to whether additional occupants are located in the motor vehicle 24; if there are additional occupants in the motor vehicle 24, a classification and/or identity of the additional occupants;

provides occupant-dependent personalization (S10, S11) based on the detected information by a) selecting a sub-quantity of data from a driver's main user profile to be used while driving (e.g., a list of recent navigation destinations and/or a list of recent calls and/or a favorites list); and/or b) selecting an element from a selection point that is to be used while driving (for example a welcome screen and/or a background design and/or so-called "skinning" for the user interface); and/or c) enabling or blocking applications and/or functions that are available to the user while driving; and/or d) enabling and/or blocking the performance of hardware that is available to the user while driving;

can generate and/or update the parameters and/or data of the driver's main user profile based on the detected information; and/or based on the detected information, generating and/or updating the parameters and/or data of the main user profile of the additional occupants.

An exemplary implementation is shown in the figures, in particular in FIG. 1.

It can optionally be provided that the parameters and/or data of a main user profile of the occupants can be generated and/or updated accordingly, if the user is an occupant of the motor vehicle, preferably an additional occupant besides the driver.

Furthermore, it can optionally be provided that instead of a personalization mode, different personalization modes can be provided for different applications; i.e., for example, different user programs or motor vehicle systems 26. These can, for example, be selected individually by the driver; or by another user.

Additional personalization modes can optionally be provided, for example an age-dependent configuration and/or for example a business-dependent configuration.

The invention claimed is:

1. A method for operating at least one motor vehicle system of a motor vehicle depending on a driving situation, the method comprising:
   identifying, by a personalization device of the motor vehicle, a driver of the motor vehicle;
   using, by the personalization device, an identity of the driver to determine multiple driver-specific configuration data sets, wherein each of the determined driver-specific configuration data sets describes configuration data of a respective user profile of the identified driver in order to personalize the at least one motor vehicle system;
   determining, by the personalization device, at least one additional occupant, which is located in the motor vehicle;
   determining, by the personalization device and using the determination of the at least one additional occupant, an intention of the driver to use the motor vehicle;
   using, by the personalization device, the determined intention to select a personalization mode from a plurality of personalization modes, wherein the selected personalization mode specifies a sub-quantity of the determined driver-specific configuration data sets; and
   configuring, by the personalization device, the at least one motor vehicle system using a driver-specific configuration data set specified by the selected personalization mode.

2. The method according to claim 1, wherein each of the driver-specific configuration data sets comprises configuration data to at least one of:
   a predetermined favorites list;
   at least one predetermined navigation destination;
   predetermined contact data;
   a predetermined image file as a background image of a screen; or
   predetermined settings for an activation state of the motor vehicle system.

3. The method according to claim 1, further comprising:
   operating the personalization device in an operating mode; and
   using the personalization device to receive an operating signal, which describes an operating action for specifying the selected personalization mode as the operating mode to be activated,
   wherein the determination of the intention of the driver comprises determining the intention of the driver as a function of the selected personalization mode.

4. The method according to claim 1, wherein the determination of the intention of the driver comprises predicting the intention of the driver as a function of the determination of the at least one additional occupant.

5. The method according to claim 1, wherein:
   the determination of the at least one additional occupant comprises determining an identity or a classification of the at least one additional occupant, and
   the determination of the intention of the driver comprises using the determined identity of the at least one additional occupant.

6. The method according to claim 1, wherein:
   the determination of the at least one additional occupant comprises determining a classification of the at least one additional occupant, and
   the determination of the intention of the driver comprises using the determined classification of the at least one additional occupant.

7. The method according to claim 6, wherein the determination of the classification of the at least one additional occupant comprises using at least one of:
   a determined age or a determined age group of the at least one additional occupant;
   a determined current occupant combination found;
   a determined identity of the respective at least one additional occupant; or
   a determined seat of the determined at least one additional occupant.

8. The method according to claim 1, further comprising:
   determining at least one reconfiguration process controlled by an operating action of a user of the motor vehicle for changing the driver-specific configuration data set of the selected personalization mode;
   depending on the determined reconfiguration process, saving the changed driver-specific configuration data set; and
   assigning the saved driver-specific configuration data set to the determined intention.

9. A personalization device, configured to:
   identify a driver of a motor vehicle;
   use an identity of the driver to determine multiple driver-specific configuration data sets, wherein each of the determined driver-specific configuration data sets describes configuration data of a respective user profile of the identified driver in order to personalize at least one motor vehicle system;
   determine at least one additional occupant, who is located in the motor vehicle;
   determine, using the determination of the at least one additional occupant, an intention of the driver to use the motor vehicle;
   use the determined intention to select a personalization mode from a plurality of personalization modes, wherein the selected personalization mode specifies a sub-quantity of the determined driver-specific configuration data sets; and
   configure the at least one motor vehicle system using a driver-specific configuration data set specified by the selected personalization mode.

10. The personalization device according to claim 9, comprising:
    a sensor device;
    a driver identification device;
    an occupant recognition device; and
    a user profile management device.

11. A motor vehicle, comprising:

a personalization device configured to:
- identify a driver of the motor vehicle;
- use an identity of the driver to determine multiple driver-specific configuration data sets, wherein each of the determined driver-specific configuration data sets describes configuration data of a respective user profile of the identified driver in order to personalize at least one motor vehicle system;
- determine at least one additional occupant, which is located in the motor vehicle;
- determine, using the determination of the at least one additional occupant, an intention of the driver to use the motor vehicle;
- use the determined intention to select a personalization mode from a plurality of personalization modes, wherein the selected personalization mode specifies a sub-quantity of the determined driver-specific configuration data sets; and
- configure the at least one motor vehicle system using a driver-specific configuration data set specified by the selected personalization mode.

* * * * *